United States Patent [19]

Pratt

[11] Patent Number: 4,530,480
[45] Date of Patent: Jul. 23, 1985

[54] COLLAPSIBLE CUP HOLDER

[76] Inventor: Michael J. Pratt, 1997 Pheasant Way, Salt Lake City, Utah 84121

[21] Appl. No.: 483,493

[22] Filed: Apr. 11, 1983

[51] Int. Cl.³ .............................................. F16M 13/00
[52] U.S. Cl. ................................................. 248/311.2
[58] Field of Search .................... 248/240.1, 27.1, 99, 248/308, 311.2; 312/323

[56] References Cited

U.S. PATENT DOCUMENTS

| | | | |
|---|---|---|---|
| 882,854 | 3/1908 | Weaver | 248/311.2 |
| 1,112,280 | 9/1914 | Fitch | 248/27.1 X |
| 1,145,264 | 7/1915 | Pflug | 312/323 X |
| 1,913,319 | 6/1933 | Wolters | 312/323 X |
| 2,282,384 | 5/1942 | Schenck | 312/323 X |
| 2,284,531 | 5/1942 | Miller et al. | 312/323 X |
| 2,649,270 | 8/1953 | Franks | 248/311.2 |
| 2,726,837 | 8/1955 | Jameson | 248/226 |
| 2,754,078 | 7/1956 | Koger | 248/311.2 |
| 2,819,141 | 1/1958 | Myer | 312/323 X |
| 2,960,300 | 11/1960 | Hunter | 248/311.2 X |
| 3,233,858 | 2/1966 | Benjamin | 248/311.2 |
| 3,260,488 | 7/1966 | Kliewer et al. | 248/99 |
| 3,637,184 | 1/1972 | O'Brien | 248/240.1 X |
| 3,784,142 | 1/1974 | O'Brien | 248/311.2 |
| 4,191,350 | 3/1980 | Ormond | 248/293 |

FOREIGN PATENT DOCUMENTS 193023  3/1964  Sweden ................................ 248/99

Primary Examiner—William H. Schultz
Attorney, Agent, or Firm—Workman, Nydegger & Jensen

[57] ABSTRACT

The present invention is directed to a novel cup holder adapted for permanent securement to an appropriate supporting surface. The apparatus of the present invention is advantageously adapted for movement between a first closed position for storage, and a second open position for use in holding a suitable container. In a presently preferred embodiment of the invention, a housing is provided that is adapted for securement to the supporting surface. Respective support and retaining assemblies are provided to support the weight of the container and to maintain the container in the desired position. Both of said assemblies are preferably substantially U-shaped in appearance, and are comprised of a plurality of hingedly interconnected components so that the assemblies may be collapsed in a bellows-like manner for storage.

16 Claims, 8 Drawing Figures

COLLAPSIBLE CUP HOLDER

BACKGROUND

1. The Field of the Invention

The present invention is related to methods and apparatus for supporting containers. More particularly, the present invention is directed to cup holders for use in automobiles and other vehicles.

2. The Prior Art

A large number of people regularly spend many hours traveling by automobile or other vehicle. During such travel, it is frequently beneficial to provide liquid refreshment for the comfort of the driver and passengers. However, most people generally prefer to drink such a beverage in small quantities over a period of time, rather than all at once.

Unfortunately, few automobiles are provided with suitable flat surfaces where a person can place a container between drinks. Further, the substantial vibration and other movement in the interior of an automobile in motion creates a high probability that an unsupported container will be spilled, even if it is placed on a flat surface. Yet, inasmuch as it is typical to drink only small portions of the liquid refreshment on an intermittent basis, it is desirable to provide a way to set the container aside between drinks so as to free the hands for other activities.

To meet this need, a number of cup holder devices have been devised that are capable of holding a container securely so as to avoid spillage, and yet be out of the way between drinks.

One such cup holder device consists of a ring having a diameter sufficient to permit insertion of a container therethrough, and a strap suspended from the ring to provide support for the bottom of the container. This device is further provided with a bracket allowing the device to be suspended from a partially opened automobile window.

Other cup holders available heretofore have followed a similar design. In general, they are comprised of a ring-like structure to provide lateral support, and a strap-like structure to provide support for the base of the container. Finally, some mechanism is provided for securing the holder in a vertical position to a supporting surface, such as a car door.

Although these conventional cup holders have proven functional, they have not met with widespread acceptance. One reason that conventional cup holders have not met with widespread acceptance is because they are aesthetically unattractive. This problem is exacerbated by the fact that even though they are used only occasionally to hold a container, they are typically left in place continuously.

As a result, most people have preferred not to install cup holders in their automobiles, preferring to maintain the aesthetic appearance of the interior of their vehicle over the occasional use of a cup holder. As a result, it is not uncommon for these people to experience frequent accidental spillages of beverage as they try to use their hands while also trying to hold a container of liquid.

In view of the foregoing, it will readily be appreciated that it would be a significant advance in the field of cup holders if a cup holder could be provided that was readily available for use when needed, yet was out of the way and did not detract from the aesthetic appearance of the automobile interior when not in use. Such a cup holder is disclosed and claimed herein.

BRIEF SUMMARY AND OBJECTS OF THE INVENTION

The present invention is directed to novel methods and apparatus for holding a container. Preferably, the apparatus of the present invention is permanently secured to a suitable supporting surface, yet is adapted for movement between a first closed position for storage and a second open position for use in holding a container.

This is accomplished by providing the apparatus of the invention with a support assembly and a retainer assembly movably secured to a housing that in turn is secured to the supporting surface, with both the support assembly and retainer assembly being collapsible for storage. Preferably, both of these assemblies are biased so that they tend to assume the open position. In order to overcome this bias, the apparatus is advantageously provided with means for securing the device in a closed position between periods of use.

The preferred structure of the retaining assembly is substantially U-shaped and comprises a front bar and two side bars, the front bar being hingedly secured to one end of the side bars, and the side bars being in turn hingedly secured to the housing. Each side bar is advantageously comprised of a pair of side bar members hingedly interconnected. This arrangement permits the retaining assembly to collapse in a bellows-like manner.

The support assembly is similarly U-shaped, and is advantageously comprised of a support bar and a pair of suspension bars. The support bar is hingedly secured to the suspension bars, which are preferably pivotally secured to the side bars of the retaining assembly in a manner such that the support assembly can be pivoted from a position substantially parallel to the retaining assembly to a position suitable for use in supporting a container. Each suspension bar is advantageously comprised of a pair of suspension members hingedly interconnected. This arrangement permits the support assembly to be collapsed concurrently with the retaining assembly for storage.

It is, therefore, a primary object of the present invention to provide an improved apparatus for holding a container that is readily available for use when needed, yet is out of the way and does not detract from the aesthetic appearance of the area in which it is used when it is not needed.

These and other objects of the present invention will become more fully apparent from the following description and appended claims taken in conjunction with the accompanying drawings.

BRIEF DESCRIPTION OF THE DRAWINGS

In the accompanying drawings, which represent the best mode presently contemplated for carrying out the present invention.

DETAILED DESCRIPTION OF THE INVENTION

Figure 1:
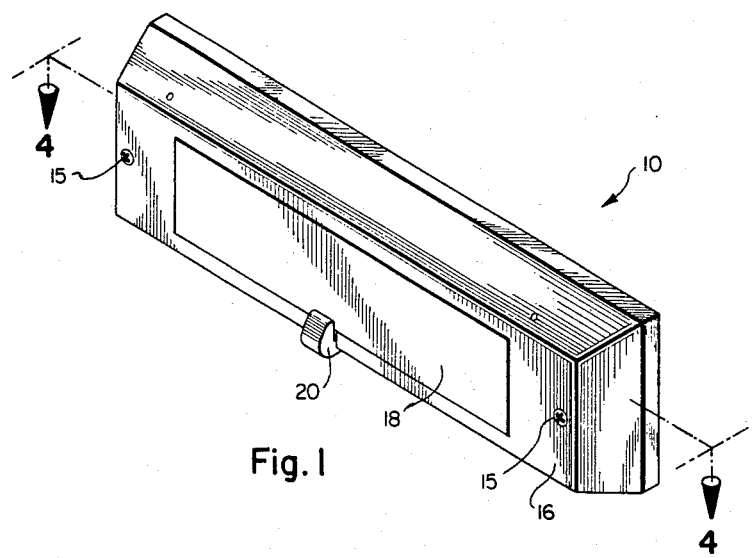
FIG. 1 is a perspective view of one presently preferred embodiment of the apparatus of the present invention adapted for attachment to a vertical surface, shown as it appears when collapsed for storage.

The present invention can best be understood by reference to the drawing, wherein like parts are designated with like numerals throughout. As will be appreciated from the following discussion, the apparatus of the present invention is well-suited for use in holding containers containing liquids in an upright position. Alternatively, the present invention may be used to hold containers of other materials as well, and may be adapted to hold such containers at any advantageous angle or position.

Figure 4:
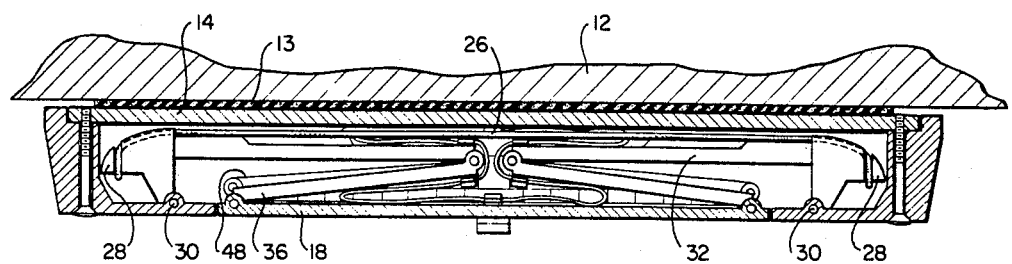
FIG. 4 is a horizontal longitudinal section taken along lines 4—4 of FIG. 1 illustrating the internal arrangement of the device when collapsed.

FIG. 1 illustrates a presently preferred embodiment 10 of the present invention, shown as it appears when collapsed between use. As best seen in FIG. 4, this embodiment is particularly well suited for securement to a vertical surface 12 by use of an adhesive strip 13 or other suitable attachment means between base plate 14 and the vertical surface.

Referring again to FIG. 1, it may be seen that the apparatus presents an attractive and unobtrusive appearance when in the collapsed position. Thus, a housing 16 conceals the various internal components of the device from view. A bar 18, which may be of a matching or contrasting material to housing 16, serves as a face plate for the device, and fits closely within a corresponding opening in the housing. This arrangement permits easy access to the internal components of the device for use, yet provides an aesthetically pleasing appearance when the device is not in use. A small catch 20 serves to retain the device in the collapsed position. Housing 16 is advantageously secured to base plate 14 by means of screws 15, although it will be appreciated that other methods of securement may be used without departing from the disclosure of the present invention.

Figure 2:
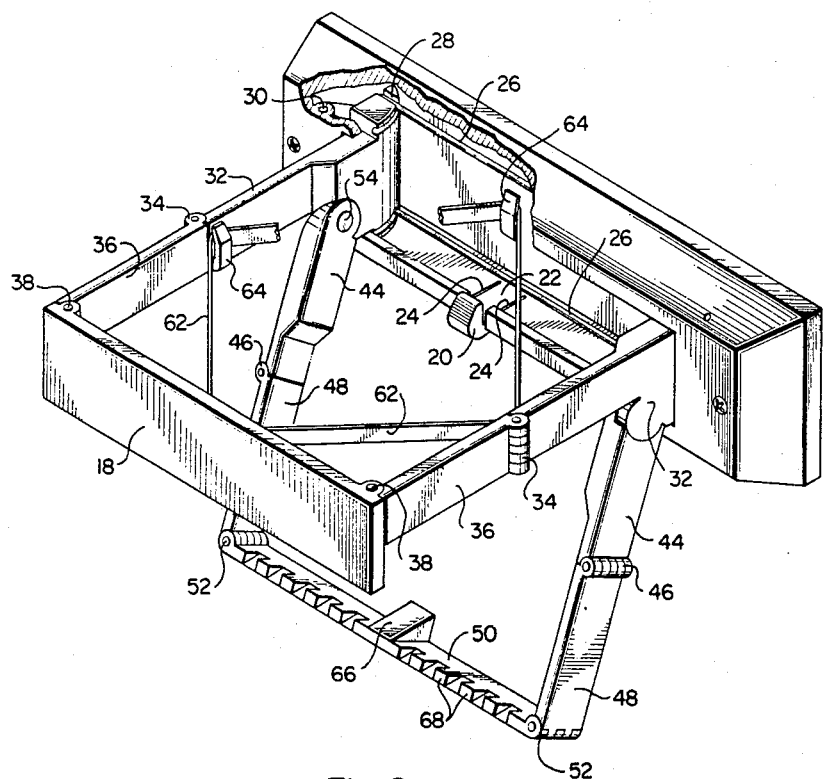
FIG. 2 is a perspective view of the embodiment of FIG. 1, shown in open position and ready for use.

Referring now to FIG. 2, catch 20 is advantageously secured to the end of a flexible arm 22. Arm 22 is conveniently formed by providing a pair of slots 24 on the bottom portion of housing 16.

FIG. 2 illustrates the presently preferred embodiment of the device as it appears when fully extended. Extension is advantageously accomplished by placing an elastic member 26 around a pair of offset lugs 28 secured to respective hinges 30. As best seen in FIG. 4, this arrangement causes elastic member 26 to be placed under tension when the device is in the closed or collapsed position; this tension then causes the device to assume its extended or open position when catch 20 is moved out of the way of bar 18.

Extending from each hinge 30, opposite offset lugs 28, are respective cantilevered arm members 32. These cantilevered arm members extend substantially horizontally from the base of the device. The leading portion of each cantilevered arm 32 is hingedly connected by means of a hinge 34 to a corresponding arm extension 36. Preferably, hinges 34 are located on the outside of cantilevered arms 32 and arm extensions 36 so that the hinges will be displaced toward each other in the manner shown in FIG. 4 when cantilevered arms 32 and arm extensions 36 are collapsed. When constructed in this manner, as seen in FIG. 4, these components collapse in a bellows-like manner. Additional hinges 38 are provided between face plate 18 and arm extensions 36 to facilitate closing of the device.

Figure 3:
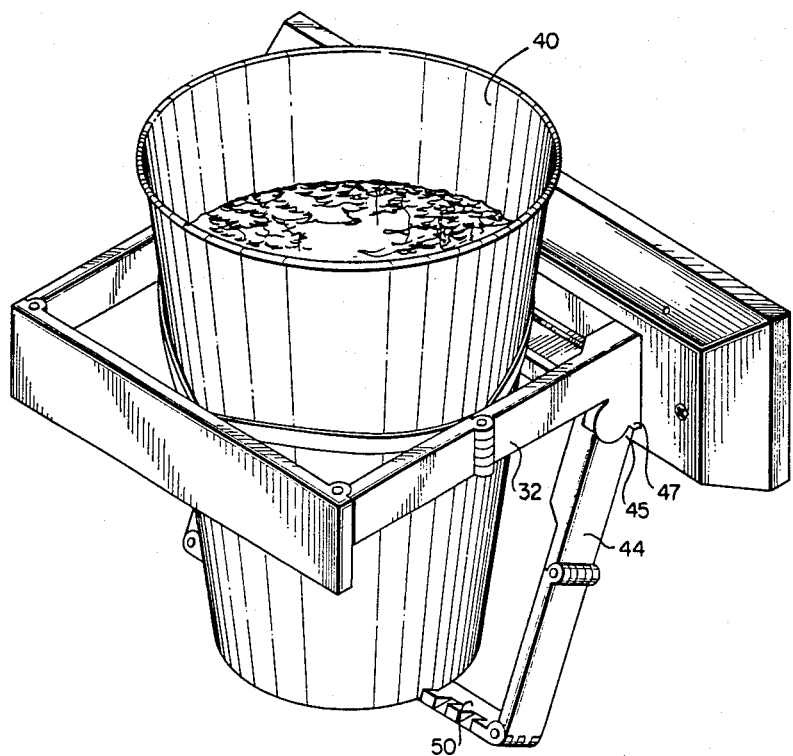
FIG. 3 is another perspective view similar to FIG. 2, but showing the device in use holding a container.
Figure 5:
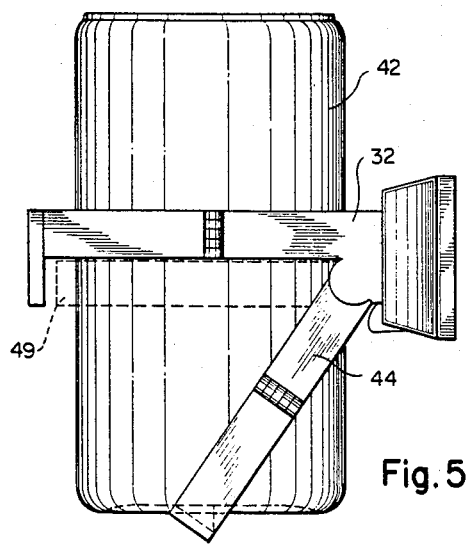
FIG. 5 is a side view of the first embodiment of the present invention shown holding a container, and showing in phantom the raised position of the support assembly.

Because of the biasing action of elastic member 26, cantilevered arms 32, arm extensions 36, and bar 18 normally assume the substantially U-shaped configuration illustrated in FIG. 2. In constructing the device, the dimensions of these various components are selected so that the open space circumscribed by these components will accommodate a typical container with which the device is intended to be used. FIGS. 3 and 5 illustrate a device having dimensions appropriate for use with a typical cup 40 or can 42, respectively, in which beverages are served. Of course, the device may also be used to hold other types of containers with other types of contents.

It will be appreciated that the above-described arrangement of cantilevered arms 32, arm extensions 36, bar 18 and housing 16 forms a retaining assembly capable of providing lateral support for a container. Vertical support is provided by a support assembly preferably comprised of a pair of upper suspension members 44 interconnected by means of hinges 46 with lower suspension members 48. A support member 50 is then preferably hingedly interconnected with lower suspension members 48 by another pair of hinges 52. The entire support assembly is then pivotally secured to pins 54 that are provided on cantilevered arms 32, respectively.

The use of a pivotable support assembly is extremely advantageous because this permits the support assembly to be moved between a predetermined position for use that provides adequate separation between support member 50 and the retaining assembly so as to insure adequate stability of the container, yet by pivoting the support assembly upward to the raised position 49 shown in phantom in FIG. 5, the support assembly is placed in line with the retaining assembly for collapse into the housing 16.

One method of restricting the downward pivoting motion of the support assembly once it has pivoted to a predetermined position for use is illustrated in FIGS. 2, 3, 5 and 6. Referring to FIG. 3, it is seen that upper suspension member 44 is advantageously provided with a stop 45 adapted to engage with an extension 47 provided on arm member 32. Selecting an appropriate dimension for extension 47 will result in adjustment of the position of support bar 50 when the support assembly is in the fully open state illustrated in FIG. 3.

Figure 6:
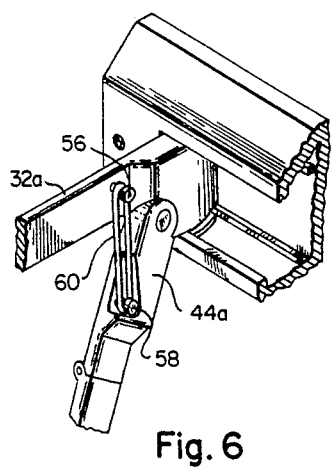
FIG. 6 is a fragmentary perspective view of an optional feature of the present invention used to bias the support assembly to the raised position.

Optionally, provision may be made to bias the support assembly to a normally raised position corresponding to the phantom lines 49 in FIG. 5. The support assembly would then be displaced to the fully open position by the weight of a container placed on the support bar. One such biasing arrangement is illustrated in FIG. 6, where it is seen that a pair of pins 56 and 58 may advantageously be provided on an interior portion of cantilevered arm 32a and lower support arm 44a, respectively. An elastic member 60 stretched between the two pins then serves to bias the movable support assembly to the raised position. By selecting an appropriate elastic member 60, it is possible to cause the support assembly to assume the raised position when no container is in place, yet to assume the lowered position when a container is inserted into the device. The advantage of using a biasing member such as elastic member 60 is that upon removal of the container, the support assembly is properly positioned for collapse for storage to the closed position of FIGS. 1 and 4.

However, it has been found satisfactory in most instances to dispense with any means for biasing the support member to the raised position. Rather, it has been found that merely by applying slight inward pressure on hinges 34 and bar 18, the support assembly quickly moves to the raised position and the support begins to collapse inwardly together with the retaining assembly.

In some instances it has been found desirable to provide an elastic member 62 suspended within the interior space formed by the retainer assembly. One means for suspending such an elastic member is to provide a plurality of posts 64 situated at various positions about the interior of the retaining assembly. Use of elastic member 62 is particularly useful when the device is to be used to hold a container substantially smaller than the open space embraced within the retainer assembly; larger diameter containers are generally supported adequately even without the use of elastic member 62.

It may also be advantageous to provide a raised platform 66 and ridges 68 along the upper surface of support member 50. Use of a raised platform 66 provides a central area of support and aids in the stabilization of a container placed thereon. Ridges 68 also serve to stabilize a container, such as illustrated in FIG. 3.

Figure 7:
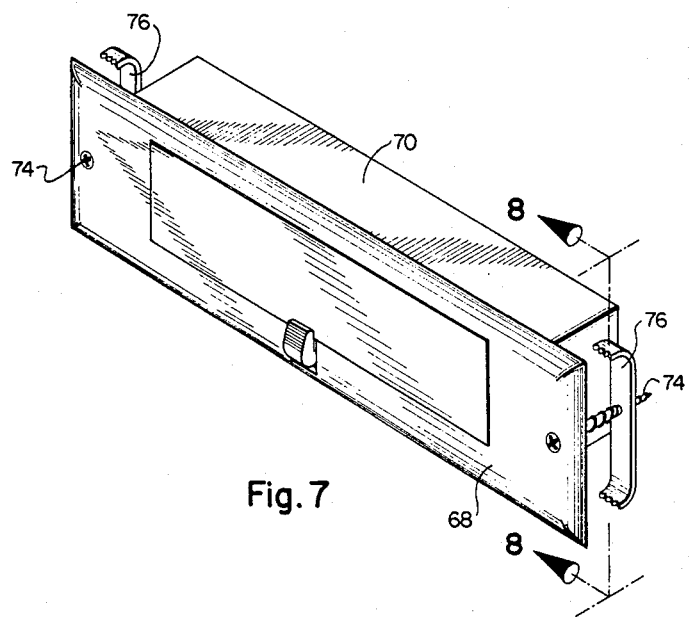
FIG. 7 is a perspective view of a second embodiment of the present invention, this embodiment being adapted for flush mounting to a vertical surface.
Figure 8:
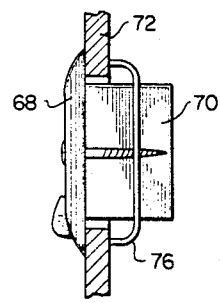
FIG. 8 is a vertical section of the second embodiment of the device taken along line 8—8 of FIG. 7, and illustrating the second embodiment installed on a vertical surface.

A second embodiment of the apparatus of the present invention is illustrated in FIGS. 7 and 8. This embodiment, while substantially identical to the first embodiment in many respects, is especially well adapted for flush-mounting of the device rather than surface mounting in the manner set forth above in connection with the first embodiment.

Referring to FIG. 7, it may be seen that a face plate 68 is advantageously secured to the front portion of a housing 70. Although not illustrated, it is anticipated that the support assembly and retaining assembly of the first embodiment would also be used in connection with the second embodiment.

The apparatus of the second embodiment of the present invention could be conveniently installed by cutting a hole in a supporting surface 72 (FIG. 8) adequate to permit insertion of the housing, but small enough so that face plate 68 is supported by the supporting surface. The device is then secured in place by use of screws 74 and anchors 76, or other suitable attachment means.

From the foregoing it will be appreciated that the present invention provides an improved holder that is capable of permanent mounting in a desired location, yet is entirely out of the way until needed. However, when needed, the apparatus of the present invention is readily placed into service. The arrangement of multiply-hinged retaining and support assemblies results in a very compact unit, since the various components readily collapse in a bellows-like manner upon application of inward force on the hinges and the front bar of the retaining assembly.

Although the apparatus of the present invention is primarily intended for use in holding containers of liquid in an upright position, it will be appreciated that other types of containers may also be held, and such containers may be held in a variety of positions.

Thus, the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. An apparatus for holding a container, comprising:
    means for supporting a lower portion of a container, said supporting means being movable between a first closed position and a second open position such that when the supporting means is in said second open position, the supporting means is capable of engaging and bearing the weight of the container;
    means for retaining the container in a predetermined position, said retaining means being movable between a first closed position and a second open position such that when the retaining means is in said second open position the retaining means minimizes substantial movement of the container positioned on the supporting means, said retaining means being substantially U-shaped and including a front bar and two side bars, said front bar being hingedly secured to one end of each side bar, and the other end of each side bar being hingedly secured to mounting means, each side bar including two side bar members hingedly interconnected so that the retaining means is adapted to be collapsed into the first closed position;
    means for releasably securing the supporting means and the retaining means in the first closed position;
    means for biasing the supporting means and the retaining means towards the second open position so that upon release of the securing means, the supporting means and the retaining means move to the second open position; and
    means for mounting the apparatus in a predetermined position, said mounting means serving to support the supporting means and the retaining means.

2. An apparatus for holding a container as defined in claim 1 wherein the configuration of the retaining means is bellows-shaped when in the first closed position.

3. An apparatus for holding a container as defined in claim 1 wherein the retaining means extends from the mounting means such that the retaining means and mounting means form an enclosed space within which the container is inserted when being held, and wherein the retaining means further comprises:
    a plurality of post members attached at substantially equidistant positions about the interior of the enclosed space formed by the front and two side bars and mounting means; and
    an elastic member suspended between said post members adapted to secure the container when held by the apparatus.

4. An apparatus for holding a container as defined in claim 1 wherein the side bars extend past the position where they are hingedly secured to the mounting means, and wherein the biasing means comprises an elastic member suspended between the extended portions of the side bars.

5. An apparatus for holding a container as defined in claim 1 wherein the supporting means is substantially U-shaped and further comprises:
  a support bar for engaging and bearing the weight of the container; and
  two suspension bars hingedly secured to said support bar, said suspension bars also being pivotally secured to the side bars of the retaining means, and said suspension bars including two suspension members hingedly interconnected, so that the supporting means is adapted to be pivoted into a position substantially parallel to the retaining means and then collapsed concurrently with the retaining means into the first closed position.

6. An apparatus for holding a container as defined in claim 5 wherein the support bar further comprises a platform member adapted to support a portion of the base of the container.

7. An apparatus for holding a container as defined in claim 5 wherein the support bar further comprises a plurality of ridge members adapted to minimize slippage of the portion of the container supported by the support bar.

8. An apparatus for holding a container, comprising:
  a support member capable of engaging a lower portion of a container placed thereon such that said member bears the weight of the container, said support member being collapsible for storage so as to be movable from a first closed position used during storage and a second open position used for supporting the container;
  a substantially U-shaped arm surrounding at least a substantial portion of the container when the container is placed upon the support member, said arm being collapsible for storage so as to be movable from a first closed position used during storage and a second open position used for retaining the container in a predetermined position, said arm including a front bar and two side bars, said front bar being hingedly secured to one end of each side bar, and the other end of each side bar being hingedly secured to the mounting means, each side bar including two side bar members hingedly interconnected so that the arm is adapted to be collapsed into the first closed position;
  a housing connected to and capable of supporting the support member and the arm, said housing being capable of storing the support member and the arm when in their respective closed positions, said housing being mountable to a supporting surface; and
  means for releasably securing the support member and the arm in the first closed position during storage.

9. An apparatus for holding a container as claimed in claim 8 wherein the configuration of the arm is bellows-shaped when in the first closed position.

10. An apparatus for holding a container as claimed in claim 8 wherein the support member is substantially U-shaped and comprises a support bar for engaging and bearing the weight of the container, and two suspension bars for suspending the support bar at a predetermined position.

11. An apparatus for holding a container as claimed in claim 10 wherein the suspension bars are pivotally secured to the arm so that the support bar may be moved between said predetermined position and a second position for storage.

12. An apparatus for holding a container as claimed in claim 11 wherein the retaining means extends from the mounting means such that the retaining means and mounting means form an enclosed space within which the container is inserted when being held, and wherein the retaining means further comprises:
  a plurality of post members attached at substantially equidistant positions about the interior of the enclosed space formed by the front and two side bars and mounting means; and
  an elastic member suspended between said post members adapted to secure the container when held by the apparatus.

13. An apparatus for holding a container, comprising:
  a housing adapted for mounting to a supporting surface;
  a retaining assembly for retaining the container in a predetermined position, said retaining assembly being substantially U-shaped and including a front bar and two side bars, said front bar being hingedly secured to one end of each side bar, and the other end of each side bar being hingedly secured to the housing, each side bar further comprising two side bar members hingedly interconnected so that the retaining assembly is adapted for movement between a first closed position used during storage and a second open position used when supporting the container;
  a support assembly for engaging a lower portion of the container placed thereon such that the support assembly bears the weight of the container, said support assembly being substantially U-shaped and including a support bar for engaging and bearing the weight of the container, and two suspension bars hingedly secured to said support bar, said suspension bars also being pivotally secured to the side bars of the retaining assembly, said suspension bars comprising two suspension members hingedly interconnected, so that the support assembly is adapted to be pivoted between a position for use in supporting the weight of the container and a position substantially parallel to the retaining assembly and then moved concurrently therewith between a second open position used when supporting the container and a first closed position used for storage; and
  means for biasing the retaining assembly and the support assembly to a predetermined position.

14. An apparatus for holding a container as claimed in claim 13 wherein the biasing means biases the retaining assembly and the support assembly towards the second open position, and further comprising means for releasably securing the retaining assembly and the support assembly in the first closed position during storage.

15. An apparatus for holding a container as claimed in claim 14 wherein the side bars of the retaining assembly extend past the position where they are hingedly secured to the housing, and wherein the biasing means includes an elastic member suspended between the extended portions of the side bars.

16. An apparatus for holding a container as claimed in claim 15 further comprising means for biasing the support assembly to the position substantially parallel to the retaining assembly when no container is being supported thereon.

* * * * *